United States Patent
Frederick et al.

(10) Patent No.: US 7,810,858 B2
(45) Date of Patent: Oct. 12, 2010

(54) HYBRID ENERGY ABSORBER FOR AUTOMOBILE BUMPER

(75) Inventors: Gregory S. Frederick, Shelby Township, MI (US); Conrad M. Kudelko, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 12/177,445

(22) Filed: Jul. 22, 2008

(65) Prior Publication Data

US 2009/0039662 A1 Feb. 12, 2009

Related U.S. Application Data

(62) Division of application No. 11/761,747, filed on Jun. 12, 2007, now Pat. No. 7,533,912.

(51) Int. Cl.
*B60R 19/22* (2006.01)
(52) U.S. Cl. ............... 293/120; 293/102; 293/121; 293/133; 296/187.09; 296/187.1; 296/187.11
(58) Field of Classification Search ............ 296/187.03, 296/187.09, 187.1, 187.11, 187.04; 293/102, 293/120, 107–110, 121, 132, 133, 155, 142–144, 293/109, 122; 188/371, 377
See application file for complete search history.

(56) References Cited

U.S. PATENT DOCUMENTS

| | | | |
|---|---|---|---|
| 3,666,310 A | 5/1972 | Burgess | |
| 3,784,182 A | 1/1974 | Sobel | |
| 4,061,384 A * | 12/1977 | Montgomery et al. | 293/109 |
| 4,061,385 A | 12/1977 | Schwartzberg | |
| 4,382,042 A | 5/1983 | Hardy | |
| 4,635,981 A | 1/1987 | Friton | |
| 4,652,031 A | 3/1987 | Loren | |
| 4,722,563 A | 2/1988 | Loren | |
| 4,762,352 A | 8/1988 | Enomoto | |
| 4,826,226 A | 5/1989 | Klie | |
| 5,265,925 A * | 11/1993 | Cox et al. | 293/120 |
| 5,290,078 A * | 3/1994 | Bayer et al. | 293/120 |
| 5,385,375 A | 1/1995 | Morgan | |
| 5,803,517 A | 9/1998 | Shibuya | |
| 5,810,406 A | 9/1998 | Reid, Jr. | |
| 5,875,875 A | 3/1999 | Knotts | |
| 6,354,641 B1 | 3/2002 | Schroeder | |
| 6,511,109 B1 * | 1/2003 | Schultz et al. | 293/120 |
| 6,547,295 B2 * | 4/2003 | Vismara | 293/133 |

(Continued)

FOREIGN PATENT DOCUMENTS

JP 2003220909 8/2003

*Primary Examiner*—Glenn Dayoan
*Assistant Examiner*—Gregory Blankenship
(74) *Attorney, Agent, or Firm*—Gregory P. Brown; Brooks Kushman P.C.

(57) ABSTRACT

An automobile bumper system including an isolator disposed adjacent a cross beam of an automobile frame, and a bumper edge guard strip mounted adjacent upper and/or lower edges of the cross beam. The bumper edge guard strip may include an upper extension fixedly engaged with an upper surface of the cross beam and a lower extension fixedly engaged with a frontal surface of the cross beam, with the upper extension having a length greater than the lower extension for distributing impact energy in a predetermined manner.

7 Claims, 14 Drawing Sheets

U.S. PATENT DOCUMENTS

| | | |
|---|---|---|
| 6,575,510 B2 | 6/2003 | Weissenborn |
| 6,609,740 B2 | 8/2003 | Evans |
| 6,659,520 B2 | 12/2003 | Bastien et al. |
| 6,672,635 B2 * | 1/2004 | Weissenborn et al. ........ 293/120 |
| 6,695,366 B2 * | 2/2004 | Cherry ........................ 293/120 |
| 6,726,262 B2 | 4/2004 | Marijnissen et al. |
| 6,746,061 B1 | 6/2004 | Evans |
| 6,755,452 B2 * | 6/2004 | Cate et al. ................... 293/120 |
| 6,758,507 B2 * | 7/2004 | Tarahomi et al. ............ 293/120 |
| 6,793,256 B2 | 9/2004 | Carley |
| 6,817,638 B1 * | 11/2004 | Choi et al. .................. 293/109 |
| 6,874,832 B2 | 4/2005 | Evans et al. |
| 6,877,785 B2 | 4/2005 | Evans et al. |
| 6,962,379 B2 | 11/2005 | Minami |
| 6,983,964 B2 | 1/2006 | Murata |
| 6,997,490 B2 | 2/2006 | Evans |
| 7,044,514 B2 * | 5/2006 | Mustafa et al. .............. 293/109 |
| 7,052,056 B2 | 5/2006 | Weissenborn |
| 7,059,642 B2 | 6/2006 | Ohno |
| 7,131,674 B2 * | 11/2006 | Evans et al. ................. 293/120 |
| 7,163,242 B2 | 1/2007 | Shuler et al. |
| 7,172,227 B2 | 2/2007 | Weissenborn |
| 7,188,876 B2 | 3/2007 | Jaarda |
| 7,222,897 B2 | 5/2007 | Evans |
| 7,226,097 B2 * | 6/2007 | Adachi et al. ............... 293/120 |
| 7,340,833 B2 | 3/2008 | Weissenborn |
| 7,370,893 B2 | 5/2008 | Tamada |
| 2001/0026073 A1 | 10/2001 | Sato |
| 2003/0020290 A1 | 1/2003 | Cherry |
| 2004/0094975 A1 | 5/2004 | Shuler et al. |
| 2006/0055187 A1 | 3/2006 | Jaarda et al. |

* cited by examiner

HYBRID ENERGY ABSORBER FOR AUTOMOBILE BUMPER

CROSS-REFERENCE TO RELATED APPLICATIONS

This application is a diviosional of U.S. application Ser. No. 11/761,747, filed Jun. 12, 2007, and issued May 19, 2009 as U.S. Pat. No. 7,533,912, hereby incorporated by reference in its entirety.

BACKGROUND OF INVENTION a. Field of Invention

The invention relates generally to vehicle structural design, and more particularly, to the structural design of a vehicle bumper system for improved impact deformation and resistance, particularly during bumper over-ride and under-ride conditions.

b. Description of Related Art

As is known in the art, automobile bumper systems are designed to absorb and distribute impact energy in a predetermined manner. While bumpers systems are generally designed to meet at equal vertical impact levels, in the event of bumper over-ride or under-ride (i.e. in the event of a car/truck collision), even a low speed impact can result in excessive vehicle damage. This is because typical bumper systems may include energy absorbers disposed at a height-wise central area of the bumper for providing impact resistance against a bumper presumably disposed at the same height, leaving the upper and lower ends of a bumper susceptible to over-ride or under-ride type collision which could result in vehicle damage.

U.S. Pat. No. 6,609,740 to Evans is exemplary of known bumper system designs. While the Evans design aims to consistently distribute the load of an impact, this design is nevertheless optimally suited for impact resistance against a bumper presumably disposed at the same height.

For example, Evans, as illustrated in FIGS. 4-6 thereof, provides for a bumper structure including bumper energy absorber (22) having top and bottom box-shaped sections (27) and (27'), which extend outwardly from beam (21) and have rearwardly extending nose section (28) in between. As illustrated in FIG. 6, kick walls (30, 31) press into the top and bottom mid-walls (23, 24), resulting in a consistent and controlled collapse of the energy absorber and tubes of the bumper beam.

Thus, as discussed above, whereas Evans attempts to provide consistent load distribution, in the event of an over-ride or under-ride condition, the respective upper or lower area of the bumper would bear almost all of the impact load, thus inhibiting the intended bumper deformation as illustrated in FIG. 6 of Evans, and resulting in excessive bumper damage. Likewise, the Evans design limits energy absorbing capability within the height of the bumper beam, and not beyond.

It is therefore desirable to provide a bumper system which provides a cost-effective means for minimizing bumper damage in the event of an over-ride or under-ride impact condition, and likewise providing consistent and predetermined bumper deformation. It is also desirable to provide a bumper system which is simple to design and manufacture, and which is readily adaptable to a variety of vehicle designs.

SUMMARY OF THE INVENTION

The invention solves the problems and overcomes the drawbacks and deficiencies of prior art bumper designs by providing an automobile bumper system including an isolator disposed adjacent a cross beam of an automobile frame, and a bumper edge guard strip mounted adjacent upper and/or lower edges of the cross beam. The bumper edge guard strip may include an upper extension fixedly engaged with an upper surface of the cross beam and a lower extension fixedly engaged with a frontal surface of the cross beam, with the upper extension having a length greater than the lower extension for distributing impact energy in a predetermined manner.

For the automobile bumper system described above, the bumper edge guard strip may be fixedly mounted, such as by a bolt, screw and the like, with the upper and frontal surfaces of the cross beam. The bumper edge guard strip may include one or more ribs connected to the upper and lower extensions for adding rigidity to the edge guard strip. Further, the bumper edge guard strip may include one or more ribs protruding from the upper extension for limiting deformation of the bumper edge guard strip. The isolator may be disposed between bumper edge guard strips mounted between the upper and lower edges of the cross beam.

The invention also provides an automobile bumper system including an isolator disposed adjacent a cross beam of an automobile frame and made of a material of a first density, and one or more ribs made of a material of a second density, higher than the first density, provided substantially (or partially) within the isolator for distributing impact energy in a predetermined manner.

For the automobile bumper system described above, the rib may be disposed generally along an upper surface of the isolator, and one or more further ribs may be disposed along a lower surface of the isolator. The ribs provided along the upper and lower surfaces of the isolator may be mirror image ribs, and in a particular embodiment, the ribs provided along the upper and lower surfaces of the isolator may include a trapezoidal cross-section. Alternatively, the rib may extend generally horizontally and is disposed generally centrally along a height of the isolator, and one or more further ribs may extend generally vertically along the height of the isolator. The bumper system may further include a frontal surface formed of the second density for distributing impact energy in a predetermined manner. In the aforementioned embodiments, the material may be a foam material. Yet further, in another embodiment, the rib may include a plastic or metal covering.

The invention yet further provides an automobile bumper system including an isolator disposed adjacent a cross beam of an automobile frame and made of a material of a first density, and a frontal surface made of a material of a second density, higher than the first density, substantially covering a front area of the isolator. The bumper system may further include an intermediate layer disposed between the isolator and frontal surface, with the intermediate layer made of a material of a third density, higher than the first and second densities, for distributing impact energy in a predetermined manner.

For the automobile bumper system described above, the isolator and frontal surface may be made of a foam material, and the intermediate layer may be made of a foam, plastic or metal.

The invention also provides an automobile bumper system including an isolator disposed adjacent a cross beam of an automobile frame. A bumper edge guard strip may be mounted adjacent an upper or lower edge of the cross beam. The bumper edge guard strip may include an upper extension fixedly engaged with frontal or upper surfaces of the cross beam and a lower extension fixedly engaged with the frontal or upper surfaces of the cross beam. The upper and/or lower extensions may provide a deformation height less than, equal to, or greater than a height of the cross beam for distributing impact energy in a predetermined manner.

For the automobile bumper system described above, the bumper edge guard strip may be fixedly mounted, such as by a bolt, screw and the like, with the upper and frontal surfaces of the cross beam. The bumper edge guard strip may include one or more ribs connected to the upper and lower extensions for adding rigidity to the edge guard strip. Further, the bumper edge guard strip may include one or more ribs protruding from the upper extension for limiting deformation of the bumper edge guard strip. The isolator may be disposed between bumper edge guard strips mounted between the upper and lower edges of the cross beam.

The invention yet further provides an automobile bumper system including a cross beam mounted adjacent an automobile frame. A bumper edge guard strip may be mounted adjacent an edge of the cross beam. The bumper edge guard strip may include a first extension fixedly engaged with frontal or side surfaces of the cross beam and a second extension fixedly engaged with the frontal or side surfaces of the cross beam. The first and/or second extensions may provide a deformation height less than, equal to, or greater than a height of the cross beam for distributing impact energy in a predetermined manner.

For the automobile bumper system described above, the bumper edge guard strip may be fixedly mounted with the frontal or side surfaces of the cross beam. The bumper edge guard strip may include one or more ribs connected to the first and second extensions for adding rigidity to the edge guard strip. The bumper edge guard strip may include one or more ribs protruding from the first extension, with the rib limiting deformation of the bumper edge guard strip. An isolator may be disposed between bumper edge guard strips mounted between the edges of the cross beam.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1A:
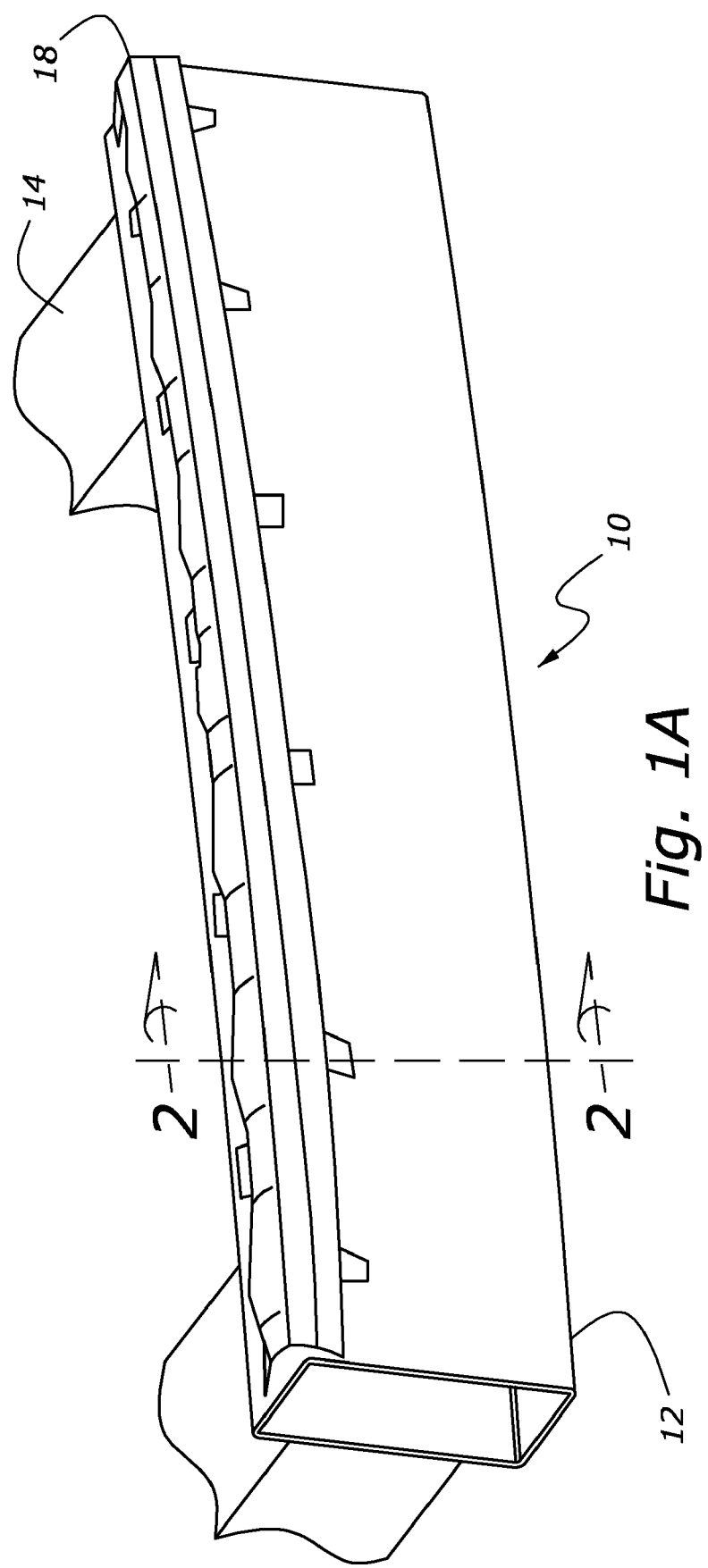
FIG. 1A is an isometric view of an embodiment of a bumper system according to the present invention, including a bumper edge guard strip for minimizing bumper deformation in the event of an over-ride condition.
Figure 1B:
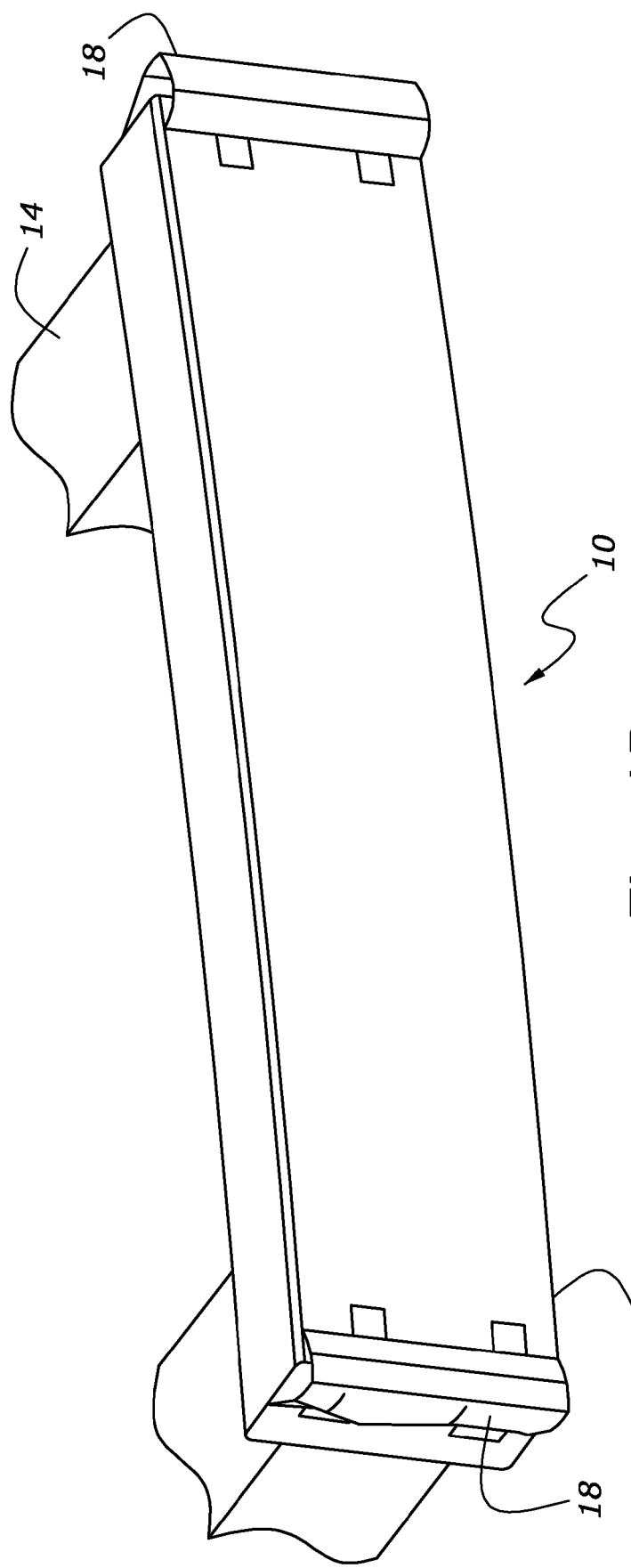
FIG. 1B is an isometric view of another embodiment of the bumper system of FIG. 1A, including bumper edge guard strips mounted along the vertical edges of a cross beam.
Figure 2:
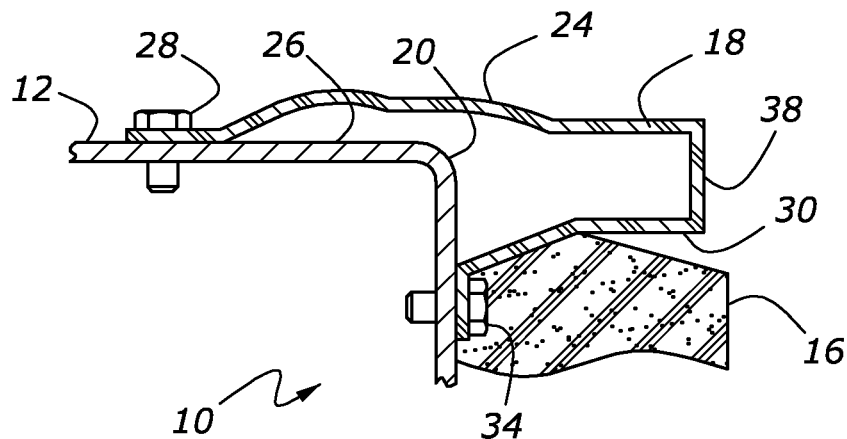
FIG. 2 is a cross-sectional view of the bumper system of FIG. 1A, taken generally along line 2-2 in FIG. 1A, illustrating the bumper edge guard strip.
Figure 3:
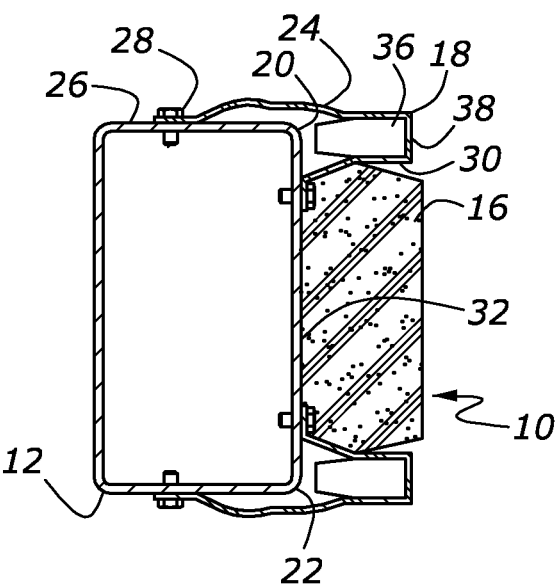
FIG. 3 is an exemplary cross-sectional view of the bumper system of FIG. 1A, taken generally along line 2-2 in FIG. 1A, but illustrating bumper edge guard strips for minimizing bumper deformation in the event of over-ride and under-ride conditions.

Referring now to the drawings wherein like reference numerals designate corresponding parts throughout the several views, FIGS. 1A-19 illustrate various embodiments of a bumper system according to the present invention, with the first embodiment being generally designated "bumper system 10".

Referring to FIGS. 1A-4, bumper system 10 may generally include a cross beam 12 mounted to frame structure 14 of an automobile (not shown). Cross beam 12 may include an isolator 16 made of foam or other materials known in the art, with isolator 16 being attached to beam 12 in a known manner. A bumper edge guard strip 18 (made of metal for example) may be fixedly mounted or otherwise fixedly engaged (i.e. in a recess (not shown)) along upper and/or lower edges 20, 22 of cross beam 12. Strip 18 may include an upper extension 24 fixedly mounted to or otherwise engaged with upper surface 26 of cross beam 12 by bolt 28, and further include a lower extension 30 fixedly mounted to or otherwise engaged with frontal surface 32 of the cross beam by bolt 34. As readily evident to those skilled in the art, other means, such as riveting etc., may be used for attachment of extensions 24, 30 to cross beam 12. A plurality of ribs 36 may be provided in engagement with, or otherwise formed with upper and lower extensions 24, 30 for adding rigidity to the structure of strip 18.

Figure 4:
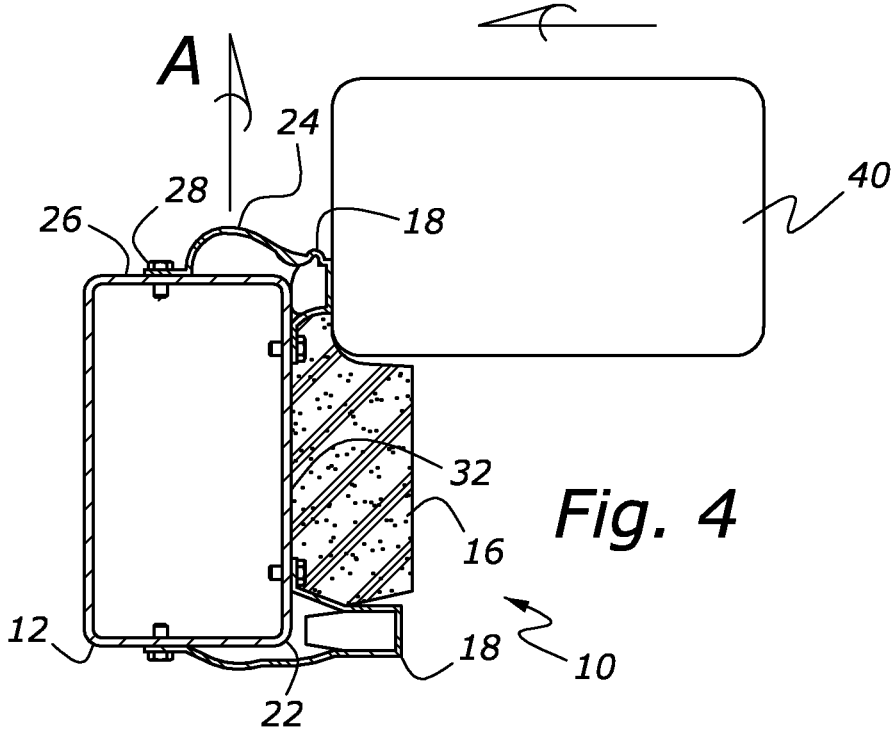
FIG. 4 is an exemplary cross-sectional view of the bumper system of FIG. 1A, similar to the view of FIG. 3, illustrating an exemplary over-ride impact condition and the associated bumper system deformation.
Figure 5A:
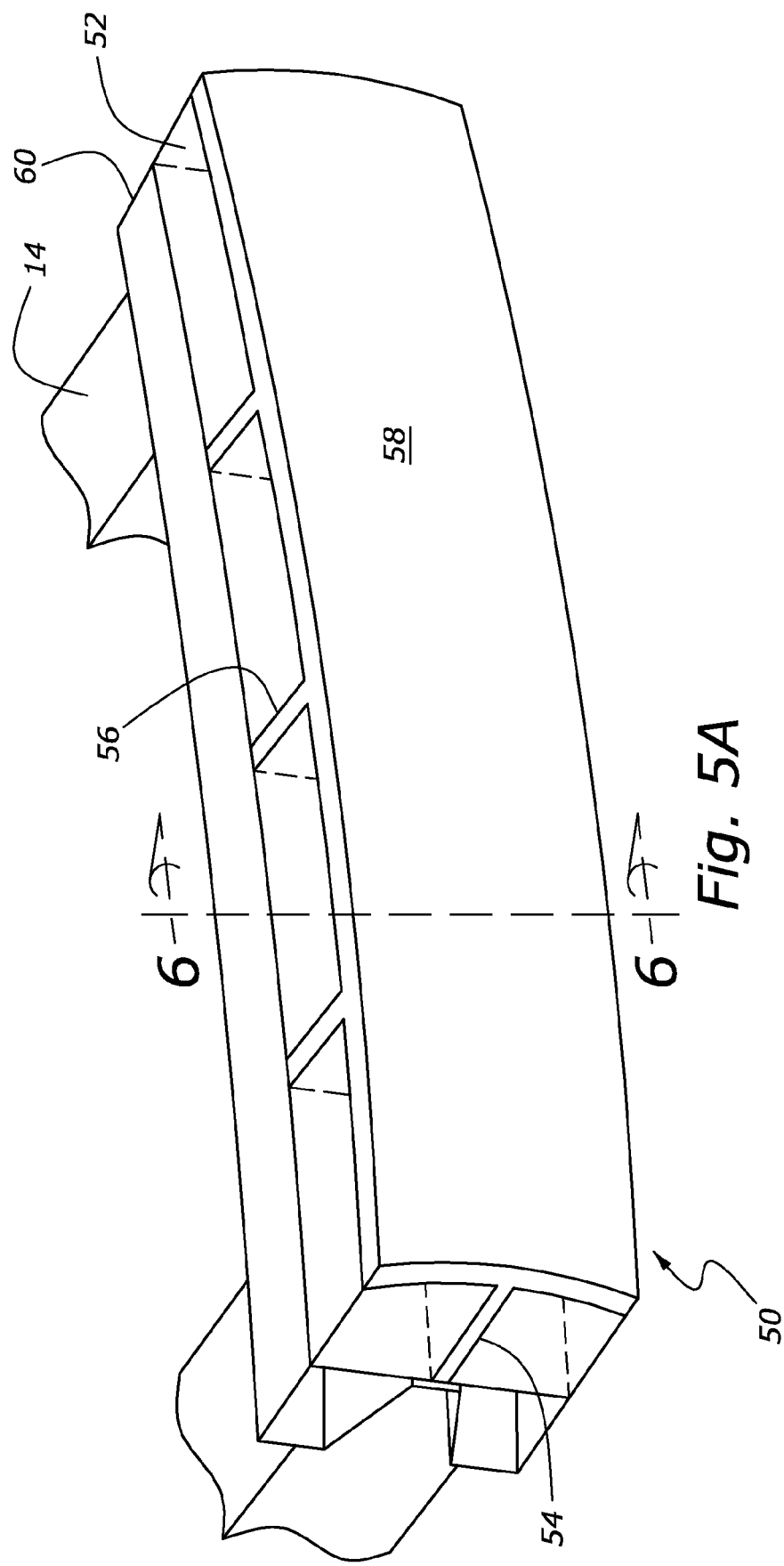
FIG. 5A is an isometric view of another embodiment of a bumper system according to the present invention, including strategically disposed variable density ribs and frontal surface.
Figure 5B:
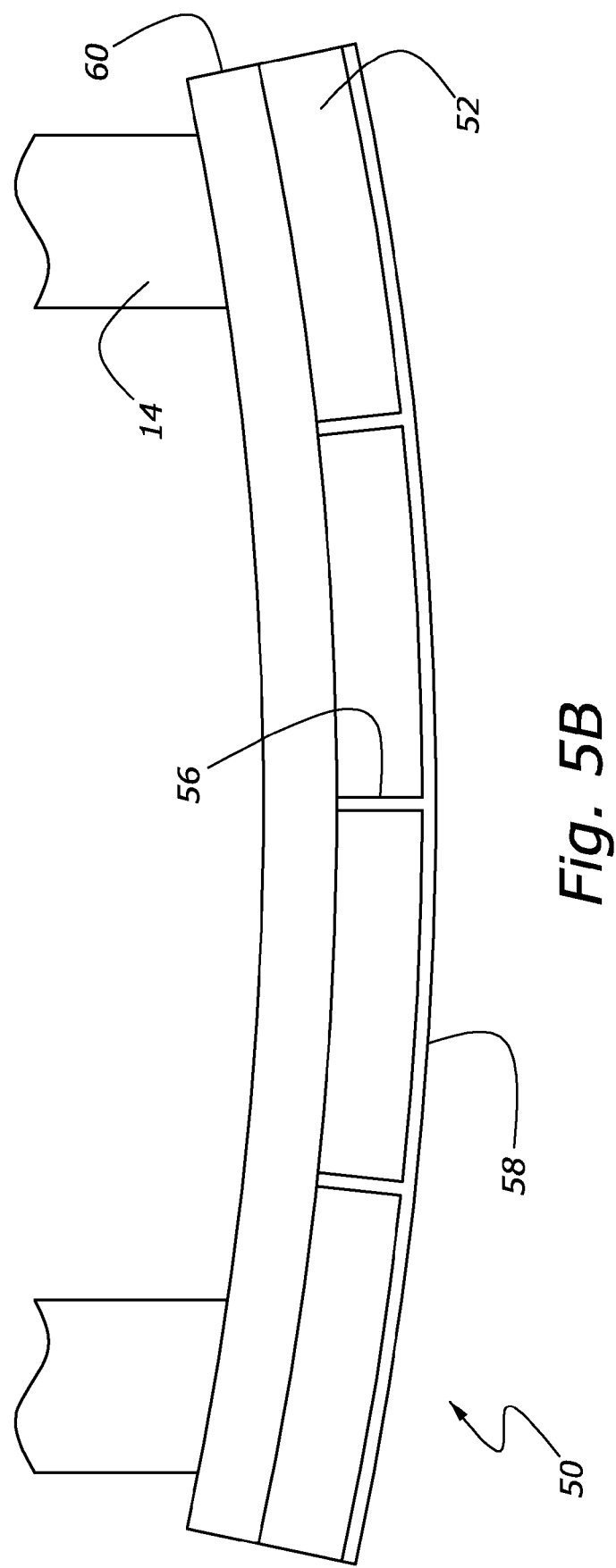
FIG. 5B is a plan view of a cross beam used with the embodiment of FIG. 5A.
Figure 6:
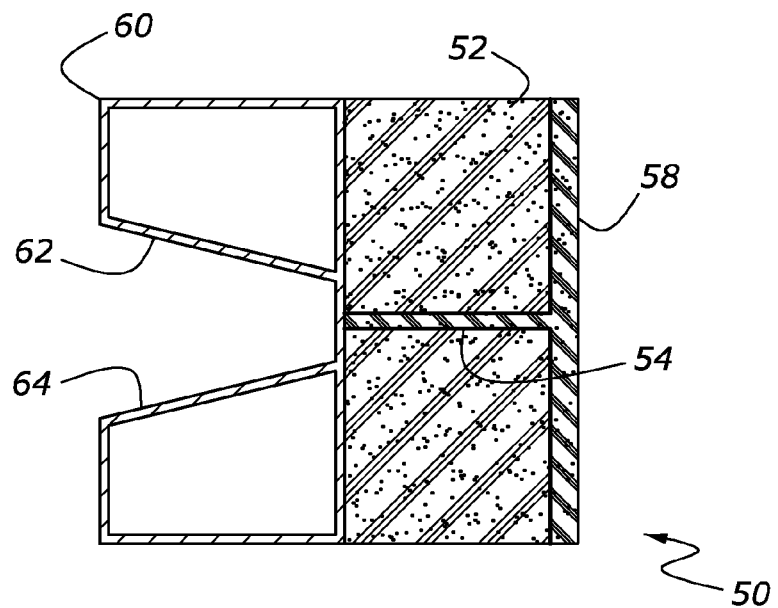
FIG. 6 is a cross-sectional view of the bumper system of FIG. 5A, taken generally along line 6-6 in FIG. 5A.

During an over-ride type impact as illustrated in FIG. 4, the front surface 38 of bumper edge guard strip 18 may thus contact impacting bumper 40 as illustrated, with upper extension 24 deforming in direction A, to minimize bumper deformation. Thus compared to an over-ride type impact without the provision of bumper edge guard strip 18, impact bumper 40 would contact the upper area of isolator 16 and may cause dive-down type movement (or lifting movement in the event of an under-ride type impact) of the vehicle (not shown). With the provision of bumper edge guard strip 18, strip 18 may absorb the impact energy and deform accordingly to prevent such a dive-down (or lifting) movement of the vehicle caused by an over-ride (or under-ride) impact condition.

Referring next to FIGS. 5A-7, another embodiment of the bumper system, hereinafter designated bumper system 50, will be described in detail.

Compared to bumper system 10 of FIGS. 1A-4, bumper system 50 may generally include an isolator 52 formed of a predetermined foam density (i.e. approximately 50-80 g/L), and horizontal and vertical ribs 54, 56 formed of a higher density foam (i.e. greater than approximately 100 g/L). Isolator 52 may further include a frontal surface 58 likewise formed of a higher density foam (i.e. greater than approximately 100 g/L). Yet further, compared to cross beam 12 of the FIGS. 1A-4 embodiment, cross beam 60 of the FIGS. 5A-7 embodiment may include a curved profile, and mirror image protrusions 62, 64 engaged with frame structure 14.

Figure 7:
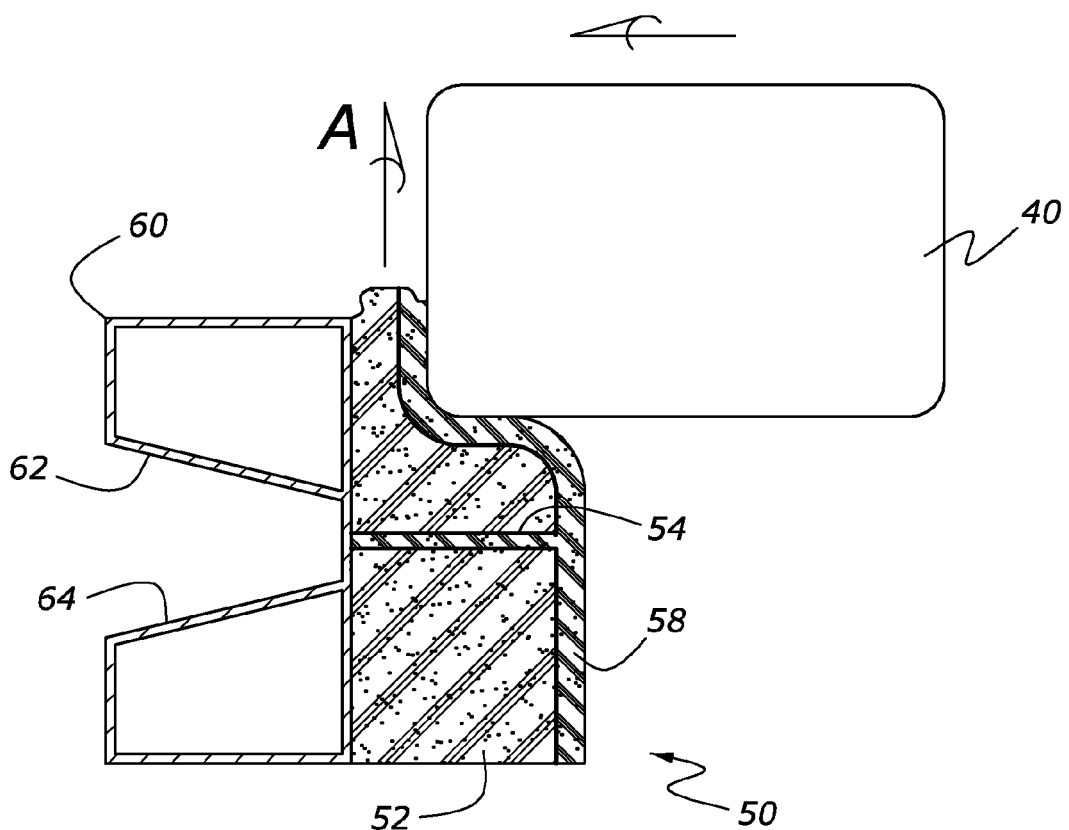
FIG. 7 is an exemplary cross-sectional view of the bumper system of FIG. 5A, illustrating an exemplary over-ride impact condition and the associated bumper system deformation (note absorber which can increase in height above the cross beam)

During an over-ride type impact as illustrated in FIG. 7, the upper surface of frontal surface 58 may thus contact impacting bumper 40 as illustrated, with the upper area of isolator 52 deforming in direction A, to minimize bumper deformation. As discussed above for bumper system 10, compared to an over-ride type impact without the provision of frontal surface 58 (and ribs 54, 56), impact bumper 40 would contact the upper area of isolator 52 and may cause dive-down type movement (or lifting movement in the event of an under-ride type impact) of the vehicle (not shown). With the provision of frontal surface 58 (and ribs 54, 56), these components may absorb the impact energy and deform accordingly to prevent such a dive-down (or lifting) movement of the vehicle caused by an over-ride (or under-ride) impact condition.

Figure 8:
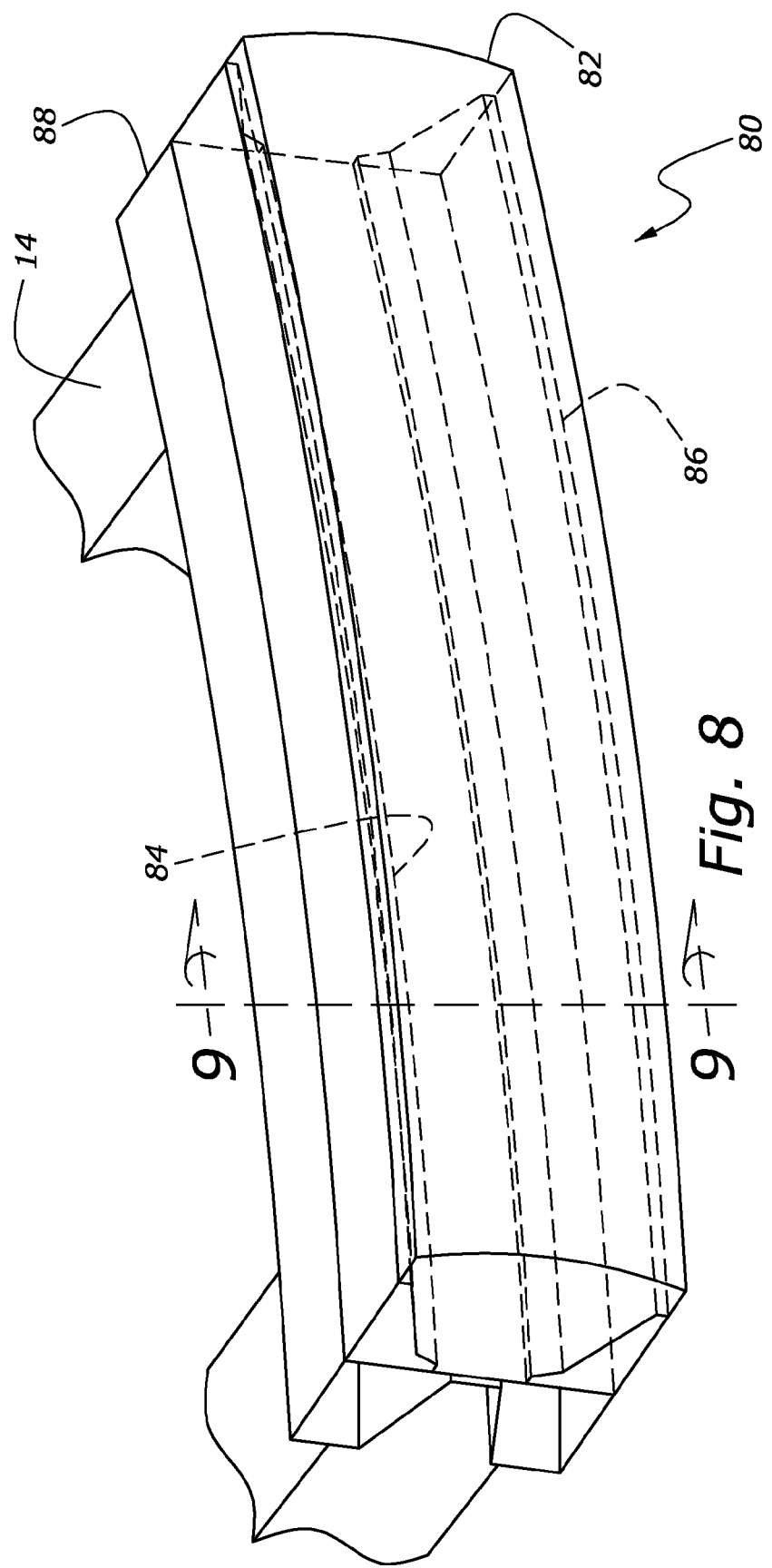
FIG. 8 is an isometric view of another embodiment of a bumper system according to the present invention, including strategically disposed variable density ribs.
Figure 9:
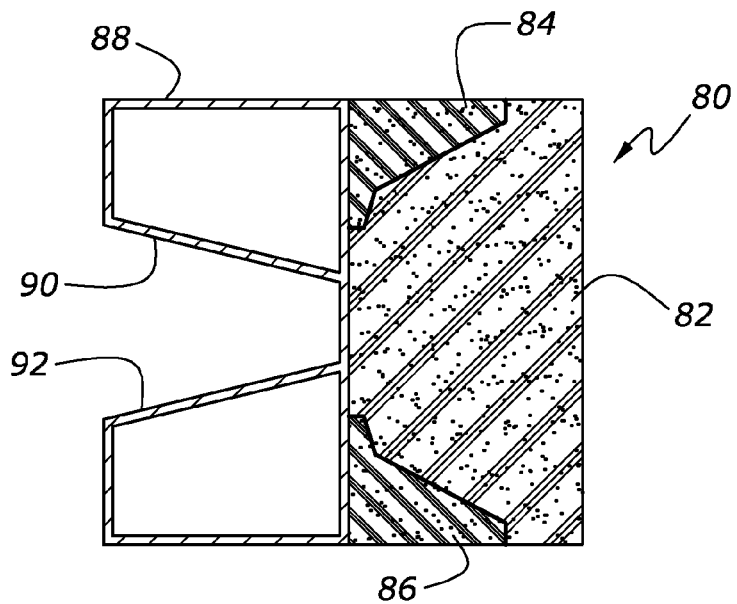
FIG. 9 is a cross-sectional view of the bumper system of FIG. 8, taken generally along line 9-9 in FIG. 8.
Figure 10:
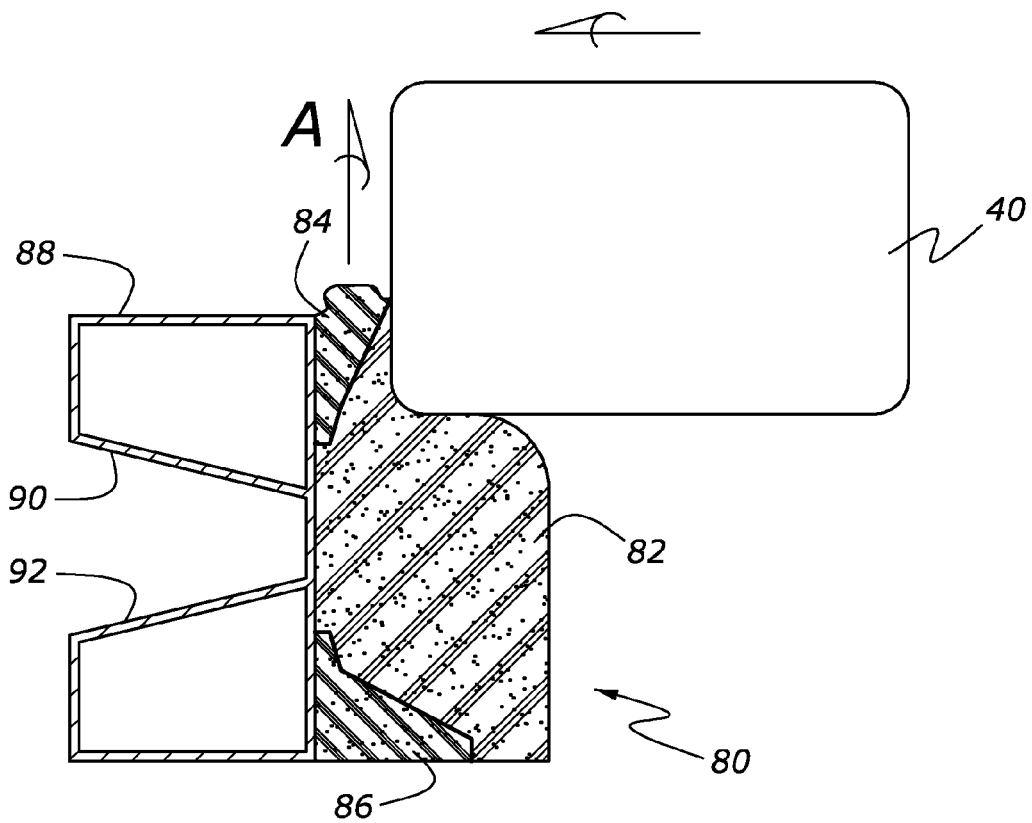
FIG. 10 is an exemplary cross-sectional view of the bumper system of FIG. 8, illustrating an exemplary over-ride impact condition and the associated bumper system deformation (note absorber which can increase in height above the cross beam)

Referring next to FIGS. 8-10, another embodiment of the bumper system, hereinafter designated bumper system 80, will be described in detail.

Compared to bumper system 10 of FIGS. 1A-4, bumper system 80 may generally include an isolator 82 formed of a predetermined foam density (i.e. approximately 50-80 g/L), and mirror image horizontal ribs 84, 86 formed of a higher density foam (i.e. greater than approximately 100 g/L). In the particular embodiment illustrated, ribs 84, 86 may include a trapezoidal configuration, and be substantially or partially embedded in isolator 82. As discussed for the embodiment of FIGS. 5A-7, compared to cross beam 12 of FIGS. 1A-4, cross beam 88 of the FIGS. 8-10 embodiment may include a curved profile, and mirror image protrusions 90, 92 engaged with frame structure 14.

During an over-ride type impact as illustrated in FIG. 10, the upper surface of isolator 82 and thereafter rib 84 may thus contact impacting bumper 40 as illustrated, with the upper area of rib 84 deforming in direction A, to minimize bumper deformation. As discussed above for bumper system 10, compared to an over-ride type impact without the provision of rib 84 (and rib 86), impact bumper 40 would contact the upper area of isolator 82 and may cause dive-down type movement (or lifting movement in the event of an under-ride type impact) of the vehicle (not shown). With the provision of rib 84 (and rib 86), these components may absorb the impact energy and deform accordingly to prevent such a dive-down (or lifting) movement of the vehicle caused by an over-ride (or under-ride) impact condition.

Figure 11:
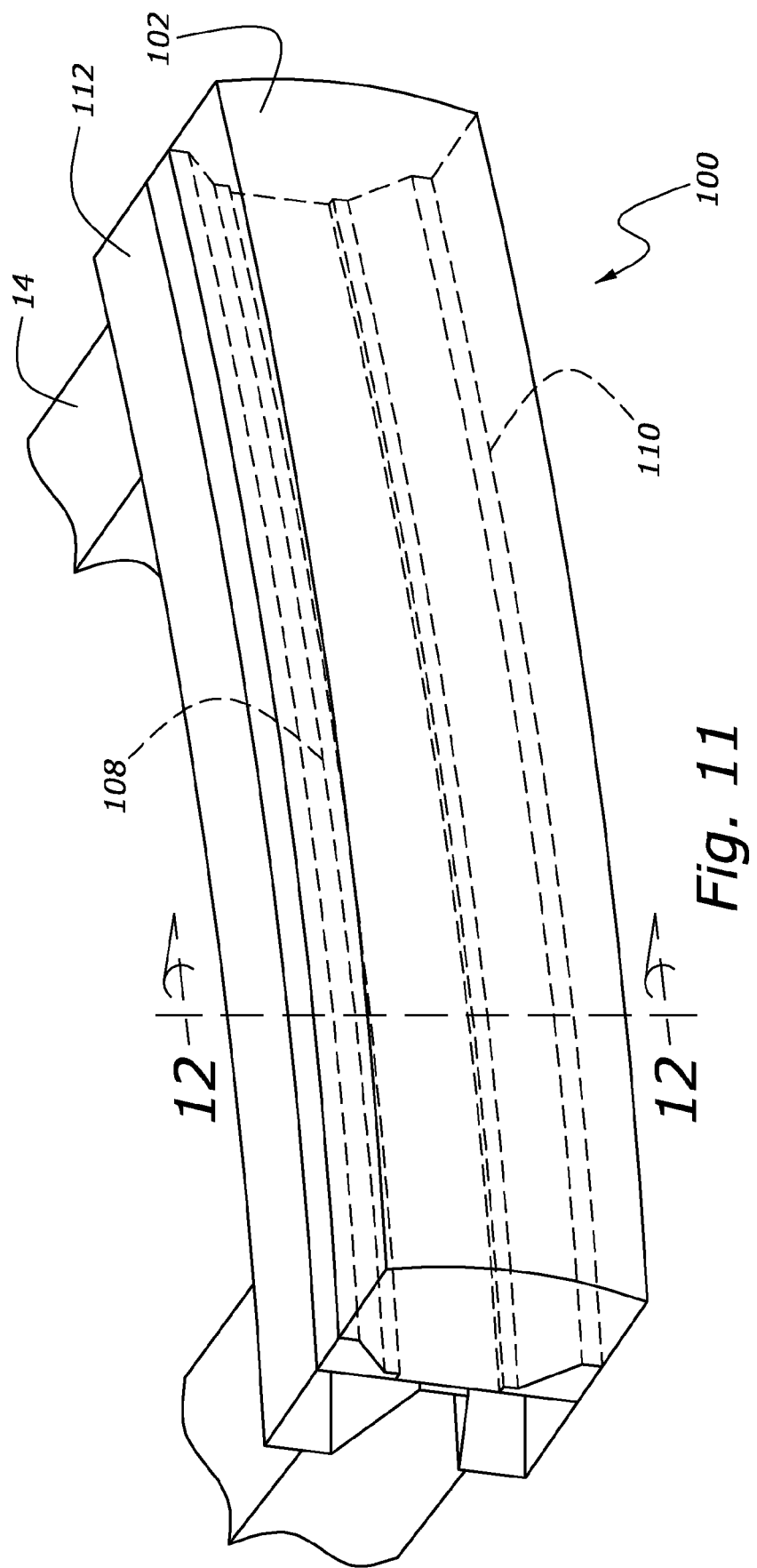
FIG. 11 is an isometric view of another embodiment of a bumper system according to the present invention, including strategically disposed metallic ribs.
Figure 12:
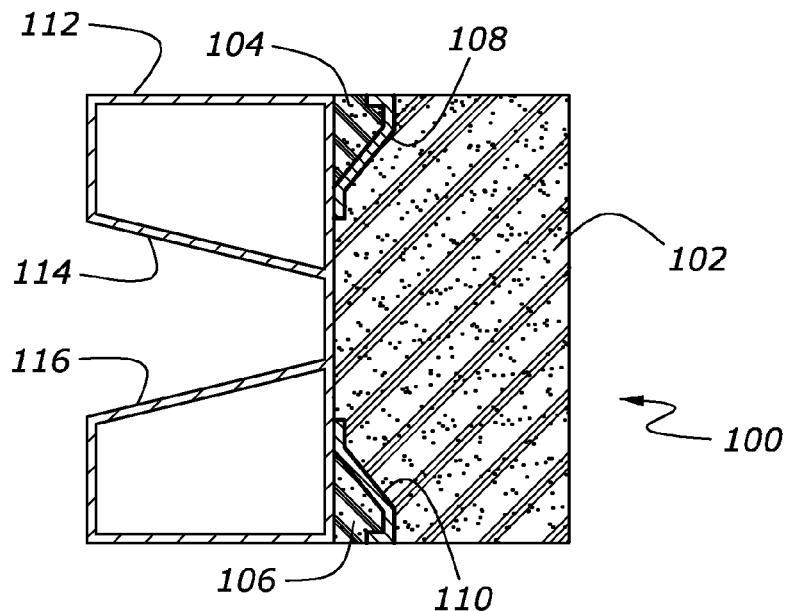
FIG. 12 is a cross-sectional view of the bumper system of FIG. 11, taken generally along line 12-12 in FIG. 11.
Figure 13:
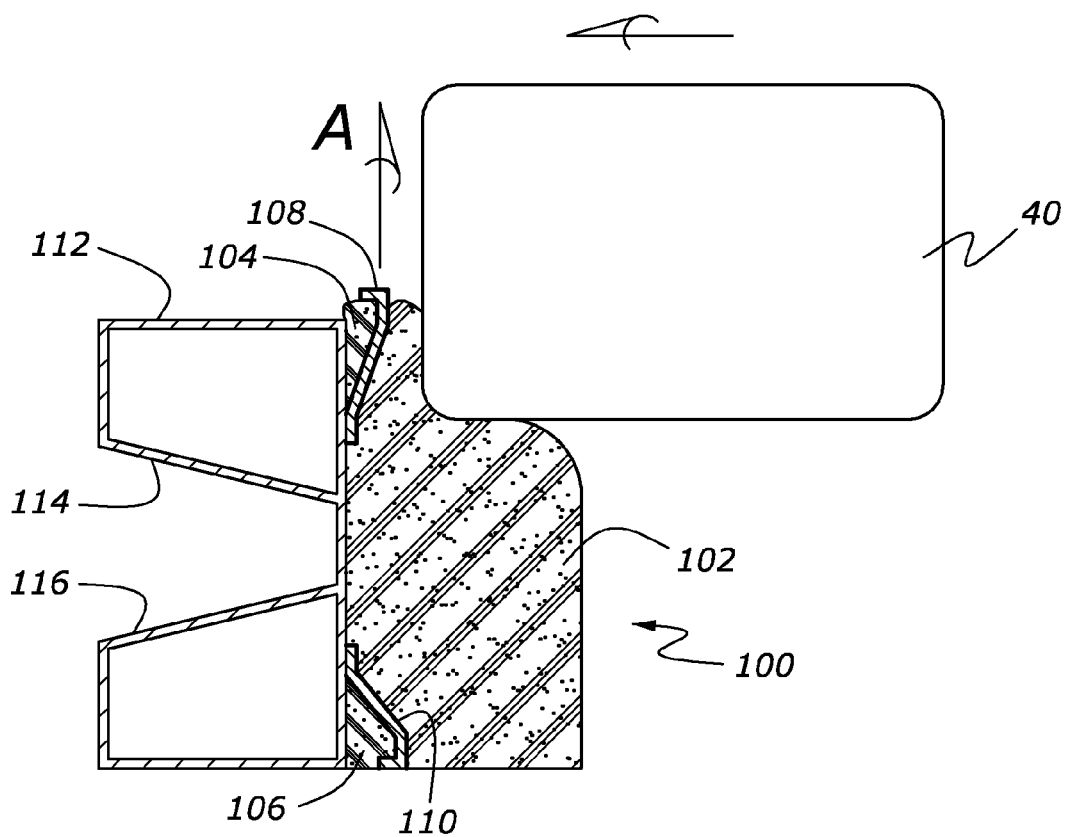
FIG. 13 is an exemplary cross-sectional view of the bumper system of FIG. 11, illustrating an exemplary over-ride impact condition and the associated bumper system deformation (note absorber which can increase in height above the cross beam)

Referring next to FIGS. 11-13, another embodiment of the bumper system, hereinafter designated bumper system 100, will be described in detail.

Compared to bumper system 10 of FIGS. 1A-4, bumper system 100 may generally include an isolator 102 formed of a predetermined foam density (i.e. approximately 50-80 g/L), and mirror image horizontal ribs 104, 106 formed of a higher density foam (i.e. greater than approximately 100 g/L) and substantially or partially embedded in isolator 102. Isolator 102 may further include mirror image metallic strips 108, 110 embedded within isolator 102 and disposed around ribs 104, 106. As discussed for the embodiment of FIGS. 5A-7, compared to cross beam 12 of FIGS. 1A-4, cross beam 112 of the FIGS. 11-13 embodiment may include a curved profile, and mirror image protrusions 114, 116 engaged with frame structure 14.

During an over-ride type impact as illustrated in FIG. 13, the upper surface of isolator 102 and thereafter rib 104 having metallic strip 108 may thus contact impacting bumper 40 as illustrated, with the upper area of rib 104 deforming in direction A, to minimize bumper deformation. As discussed above for bumper system 10, compared to an over-ride type impact without the provision of rib 104 including metallic strip 108 (and rib 106 including metallic strip 110), impact bumper 40 would contact the upper area of isolator 102 and may cause dive-down type movement (or lifting movement in the event of an under-ride type impact) of the vehicle (not shown). With the provision of rib 104 including metallic strip 108 (and rib 106 including metallic strip 110), these components may absorb the impact energy and deform accordingly to prevent such a dive-down (or lifting) movement of the vehicle caused by an over-ride (or under-ride) impact condition.

Figure 14:
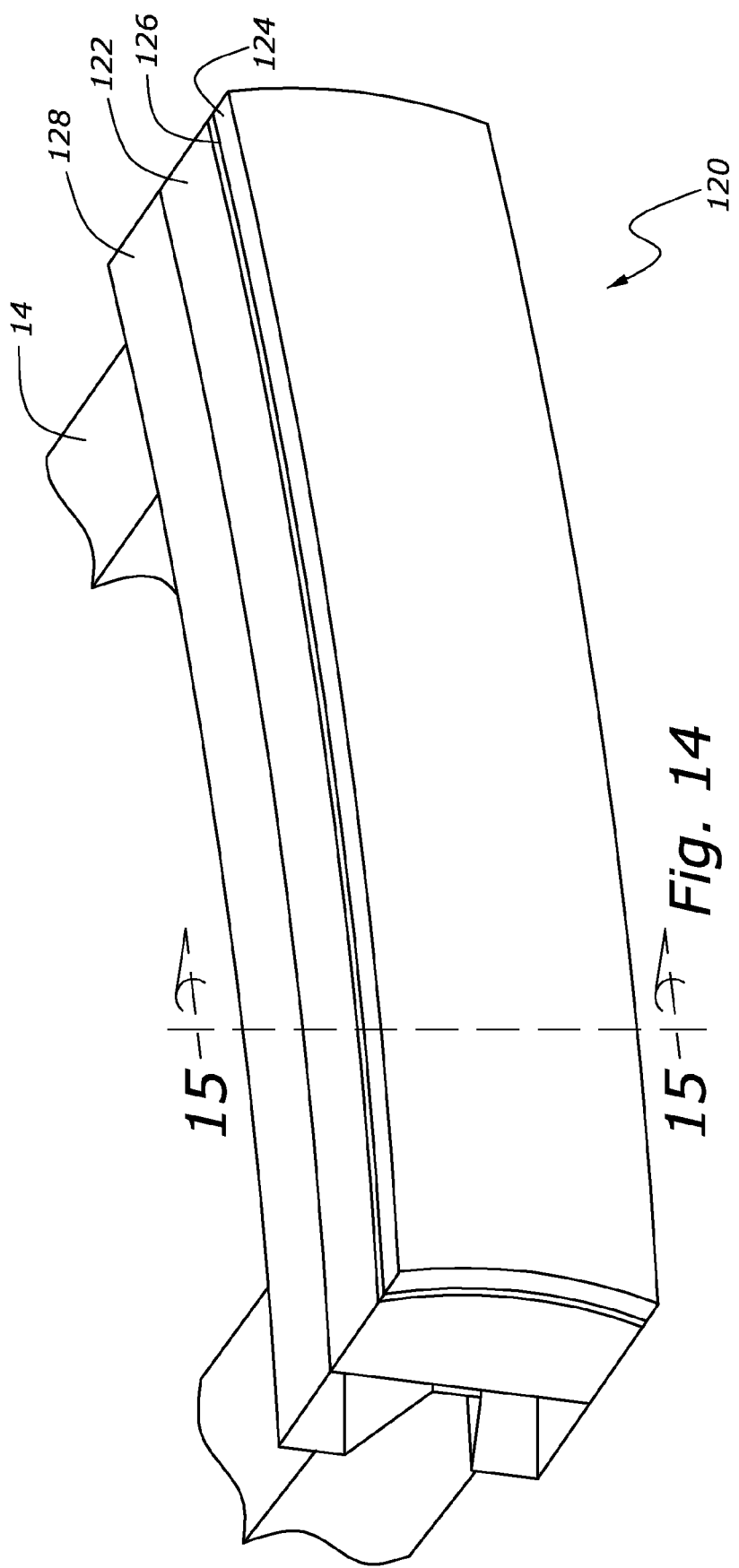
FIG. 14 is an isometric view of another embodiment of a bumper system according to the present invention, including a strategically disposed variable density frontal surface.
Figure 15:
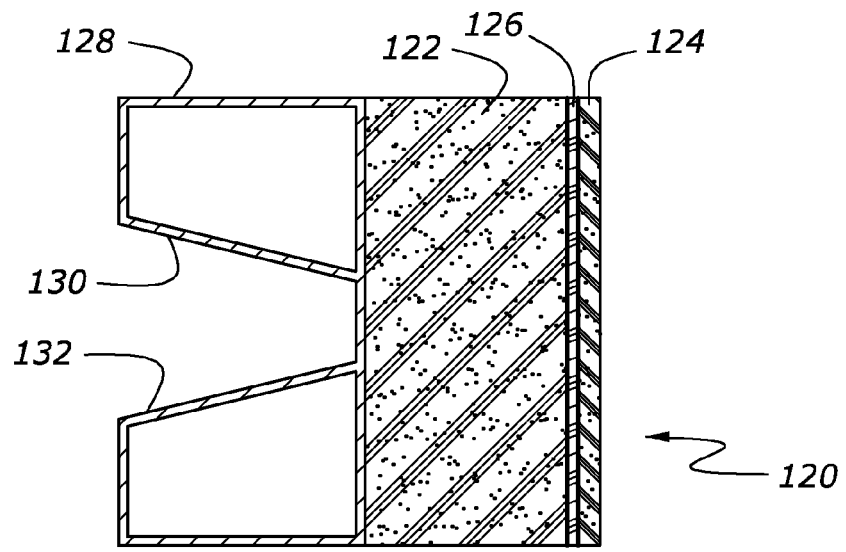
FIG. 15 is a cross-sectional view of the bumper system of FIG. 14, taken generally along line 15-15 in FIG. 14.
Figure 16:
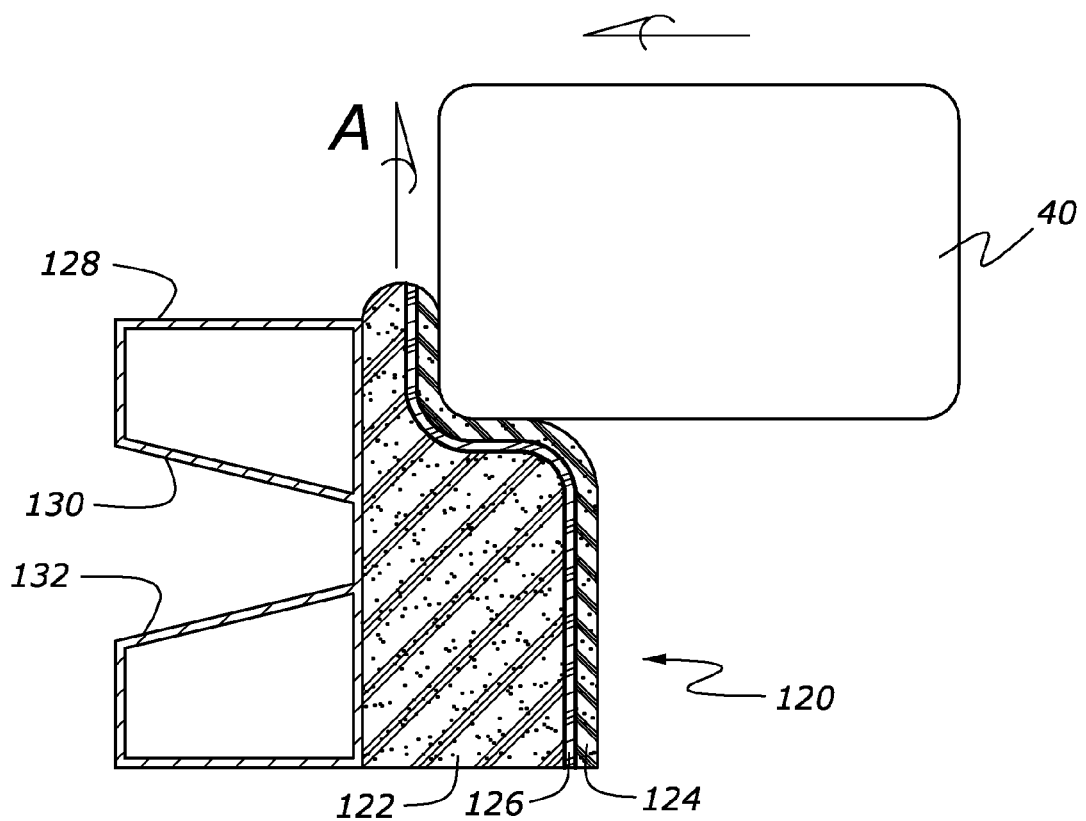
FIG. 16 is an exemplary cross-sectional view of the bumper system of FIG. 14, illustrating an exemplary over-ride impact condition and the associated bumper system deformation (note absorber which can increase in height above the cross beam)

Referring next to FIGS. 14-16, another embodiment of the bumper system, hereinafter designated bumper system 120, will be described in detail.

Compared to bumper system 10 of FIGS. 1A-4, bumper system 120 may generally include an isolator 122 formed of a predetermined foam density (i.e. approximately 50-80 g/L), and a frontal surface 124 formed of a higher density foam (i.e. greater than approximately 100 g/L). Isolator 122 may further a layer 126 embedded between layers 122, 124, with layer 126 being made of a higher density foam, plastic or metal. As discussed for the embodiment of FIGS. 5A-7, compared to cross beam 12 of FIGS. 1A-4, cross beam 128 of the FIGS.

14-16 embodiment may include a curved profile, and mirror image protrusions 130, 132 engaged with frame structure 14.

During an over-ride type impact as illustrated in FIG. 7, the upper surface of frontal surface 124 may thus contact impacting bumper 40 as illustrated, with the upper area of isolator 122 deforming in direction A, to minimize bumper deformation. As discussed above for bumper system 10, compared to an over-ride type impact without the provision of frontal surface 124 (and layer 126), impact bumper 40 would contact the upper area of isolator 122 and may cause dive-down type movement (or lifting movement in the event of an under-ride type impact) of the vehicle (not shown). With the provision of frontal surface 124 (and layer 126), these components may absorb the impact energy and deform accordingly to prevent such a dive-down (or lifting) movement of the vehicle caused by an over-ride (or under-ride) impact condition.

Figure 17:
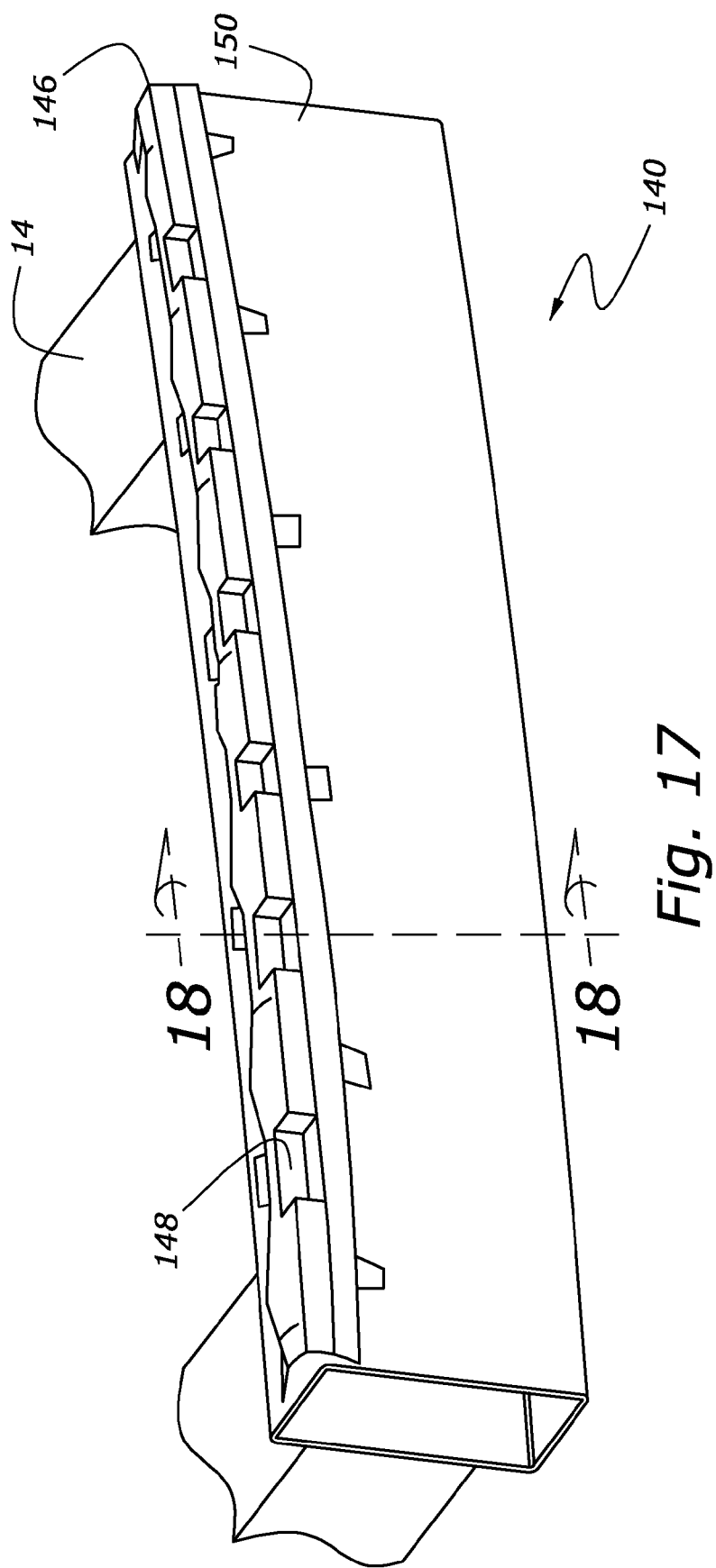
FIG. 17 is an isometric view of another embodiment of a bumper system according to the present invention, including another embodiment of the bumper edge guard strip of FIG. 1.
Figure 18:
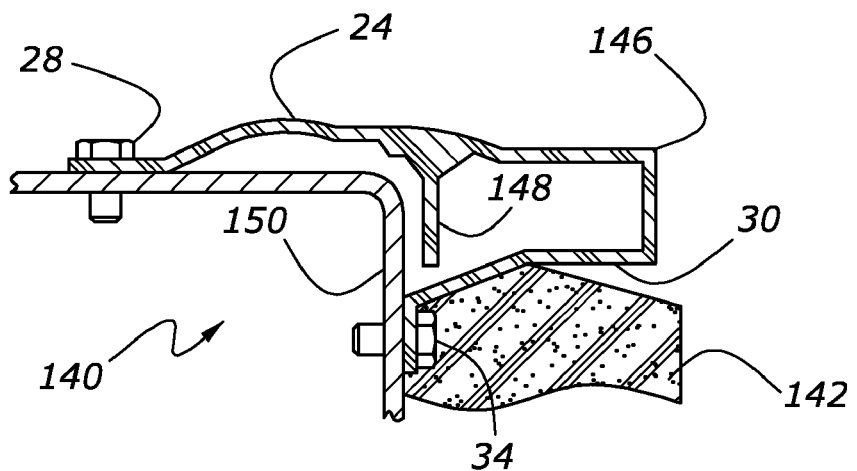
FIG. 18 is a cross-sectional view of the bumper system of FIG. 17, taken generally along line 18-18 in FIG. 17.
Figure 19:
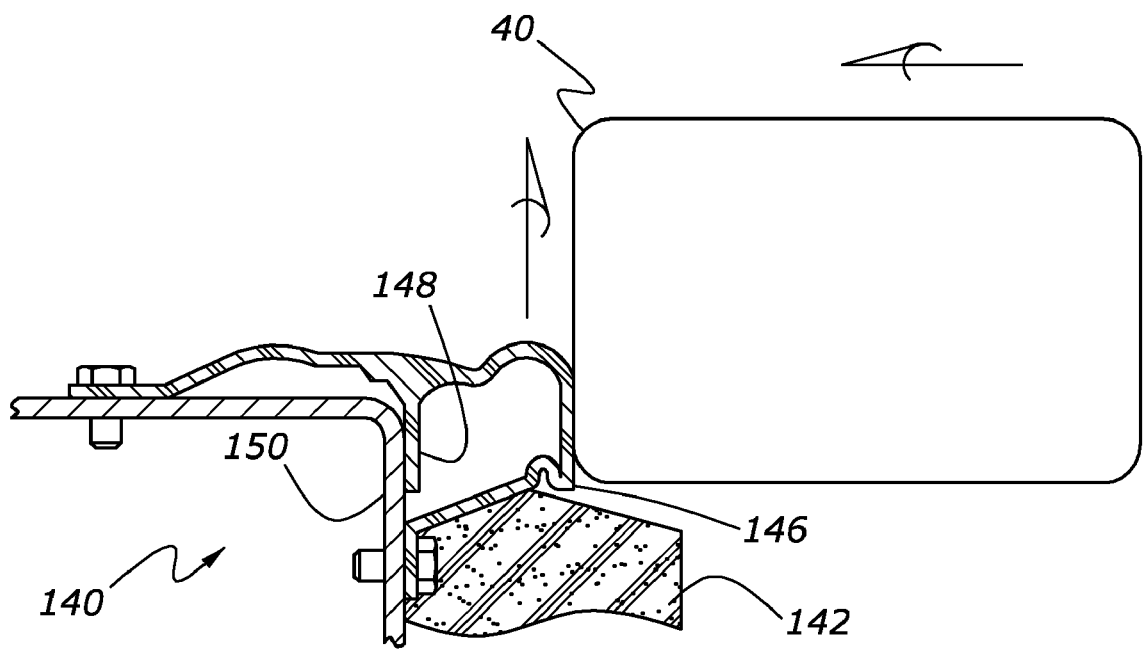
FIG. 19 is an exemplary cross-sectional view of the bumper system of FIG. 17, illustrating an exemplary over-ride impact condition and the associated bumper system deformation (note absorber which can increase in height above the cross beam).

Referring next to FIGS. 17-19, another embodiment of the bumper system, hereinafter designated bumper system 140, will be described in detail.

Compared to bumper system 10 of FIGS. 1A-4, bumper system 140 may generally include an isolator 142 having bumper edge guard strip 146 including ribs 148 for limiting deformation of strip 146 by contacting cross beam 150.

During an over-ride type impact as illustrated in FIG. 19, the front surface of bumper edge guard strip 146 may thus contact impacting bumper 40 as illustrated, with upper extension 24 deforming in direction A, to minimize bumper deformation. Thus compared to an over-ride type impact without the provision of bumper edge guard strip 146, impact bumper 40 would contact the upper area of isolator 142 and may cause dive-down type movement (or lifting movement in the event of an under-ride type impact) of the vehicle (not shown). With the provision of bumper edge guard strip 146 including ribs 148, strip 146 may absorb the impact energy and deform accordingly to prevent such a dive-down (or lifting) movement of the vehicle caused by an over-ride (or under-ride) impact condition.

To thus summarize, the present invention provides a bumper system which provides a cost-effective means for minimizing bumper damage in the event of an over-ride or under-ride impact condition with the provision of the aforedescribed bumper edge guard strips 18, 146, ribs 54, 56, 84 and 86, and frontal surfaces 58, 124. As also described above, the provision of the noted elements provides consistent and predetermined bumper deformation, with the design being readily adaptable to a variety of vehicle designs.

Those skilled in the art would readily appreciate in view of this disclosure that various modifications could be made to the aforementioned components, without departing from the scope of the present invention. For example, whereas the embodiments of FIGS. 1A-19 have been described as separately including components such as bumper edge guard strips 18, 146, ribs 54, 56, 84 and 86, and frontal surfaces 58, 124, it should be noted that these components may be used in combination (i.e. bumper edge guard strips 18 of the FIGS. 1A-4 embodiment may be used in conjunction with the embodiment of FIGS. 14-16 etc.). For the embodiment of FIGS. 1A-4, bumper edge guard strips 18 (and 146) may be used without isolator 16. The aforementioned bumper edge guard strips 18, 146, ribs 54, 56, 84 and 86, and frontal surfaces 58, 124 may be used for localized conditions on a cross beam (as opposed to along the entire length of a cross beam) as needed. Yet further, the aforementioned bumper edge guard strips 18, 146, and ribs 54, 56, 84 and 86 may be disposed in a 90° (or in an oblique) configuration for predetermined deformation of the vertical (see FIG. 1B; or oblique) edges or other areas of a bumper structure.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An automobile bumper system comprising:
    a cross beam;
    an isolator disposed adjacent the cross beam and made of a first compressible material of a first density; and
    at least one rib made of a second compressible material of a second density, higher than the first density, disposed adjacent a top rear surface of the isolator.

2. An automobile bumper system according to claim 1, further comprising at least one further rib disposed adjacent a bottom rear surface of the isolator.

3. An automobile bumper system according to claim 2, wherein the ribs adjacent the top rear and bottom rear surfaces of the isolator are minor image ribs.

4. An automobile bumper system according to claim 2, wherein at least one of the ribs includes a trapezoidal cross-section.

5. An automobile bumper system according to claim 1, wherein at least one of the first material and the second material is a foam material.

6. An automobile bumper system according to claim 1, further comprising a metallic strip embedded within the isolator and adjacent the rib.

7. An automobile bumper system comprising:
    a cross beam;
    an isolator disposed adjacent a frontal surface of the cross beam and made of a first compressible material of a first density; and
    an upper rib disposed adjacent a top rear surface of the isolator and sandwiched between the isolator and the frontal surface of the cross beam; and
    a lower rib disposed adjacent a bottom rear surface of the isolator and sandwiched between the isolator and the frontal surface of the cross beam, the upper and lower ribs formed of a second compressible material of a second density higher than the first density.

* * * * *